United States Patent
Mase

(10) Patent No.: US 9,108,298 B2
(45) Date of Patent: Aug. 18, 2015

(54) METHOD OF TREATING SURFACE OF MOLD AND MOLD HAVING SURFACE TREATED BY SAID METHOD

(75) Inventor: Keiji Mase, Edogawa-ku (JP)

(73) Assignee: FUJI MANUFACTURING CO., LTD., Tokyo (JP)

( * ) Notice: Subject to any disclaimer, the term of this patent is extended or adjusted under 35 U.S.C. 154(b) by 872 days.

(21) Appl. No.: 13/187,918

(22) Filed: Jul. 21, 2011

(65) Prior Publication Data

US 2012/0043044 A1 Feb. 23, 2012

(30) Foreign Application Priority Data

Aug. 18, 2010 (JP) ................. 2010-183110

(51) Int. Cl.
| | |
|---|---|
| *B24C 1/08* | (2006.01) |
| *B29C 45/26* | (2006.01) |
| *B22C 9/12* | (2006.01) |
| *B24C 1/06* | (2006.01) |
| *B24C 1/10* | (2006.01) |
| *C21D 7/06* | (2006.01) |
| *B22C 9/18* | (2006.01) |

(52) U.S. Cl.
CPC ... *B24C 1/08* (2013.01); *B22C 9/12* (2013.01); *B22C 9/18* (2013.01); *B24C 1/06* (2013.01); *B24C 1/10* (2013.01); *B29C 45/263* (2013.01); *C21D 7/06* (2013.01)

(58) Field of Classification Search
CPC   B29C 45/263; B29C 45/37; B29C 66/73161; C04B 2235/945; C04B 2235/963; B24C 1/10; C21D 7/06; B22C 9/18

USPC .............. 249/117, 174, 187.1; 451/38, 39, 40
See application file for complete search history.

(56) References Cited

U.S. PATENT DOCUMENTS

| | | | | |
|---|---|---|---|---|
| 4,250,950 | A | * | 2/1981 | Buxmann et al. .............. 164/430 |
| 4,258,084 | A | * | 3/1981 | Hayden, Sr. ................... 427/239 |
| 5,139,581 | A | * | 8/1992 | Grimm et al. ................. 148/632 |
| 5,424,219 | A | * | 6/1995 | Jirikowski ..................... 436/518 |

(Continued)

FOREIGN PATENT DOCUMENTS

| | | |
|---|---|---|
| JP | 3154033 | 2/2001 |
| JP | 2006-159402 | 6/2006 |

(Continued)

OTHER PUBLICATIONS

Japanese Office Action issued Mar. 31, 2014, in Japan Patent Application No. 2010-183110.

*Primary Examiner* — Timothy V Eley

(74) *Attorney, Agent, or Firm* — Oblon, McClelland, Maier & Neustadt, L.L.P.

(57) ABSTRACT

Provided is a method of treating a surface of a mold to achieve good demoldability and capable of preventing wearing of the mold by avoiding load concentration on one part of the surface of the mold. After a first blasting is performed on the surface of the mold to remove a hardened layer produced on the surface and/or to adjust the surface roughness, a second blasting is performed to create fine irregularities on the surface. Then, an elastic abrasive in which abrasive grains are carried on an elastic body, or a plate-like abrasive having a planar shape with a maximum length that is 1.5 to 100 times the thickness thereof, is ejected onto the surface of the mold at an inclined ejection angle such that the abrasive is caused to slide along the mold surface to flatten peaks of the irregularities created on the mold surface.

16 Claims, 8 Drawing Sheets

THIRD BLASTING
(REMOVAL OF PEAKS OF
PROTRUSIONS AND FLATTENING)

(56) References Cited

U.S. PATENT DOCUMENTS

2008/0173422 A1* 7/2008 Fehlemann et al. .......... 164/418
2012/0237728 A1* 9/2012 Kimura et al. ................ 428/141

FOREIGN PATENT DOCUMENTS

| JP | 2009-107284 | 5/2009 |
| JP | 2009-202307 | 9/2009 |

* cited by examiner

**SECOND BLASTING
(FORMING RECESSES)**

**THIRD BLASTING
(REMOVAL OF PEAKS OF
PROTRUSIONS AND FLATTENING)**

FIRST BLASTING
(REMOVAL OF HARD FILM AND/OR FLATTENING)

**SECOND BLASTING
(FORMING RECESSES)**

**THIRD BLASTING
(REMOVAL OF PEAKS OF
PROTRUSIONS AND FLATTENING)**

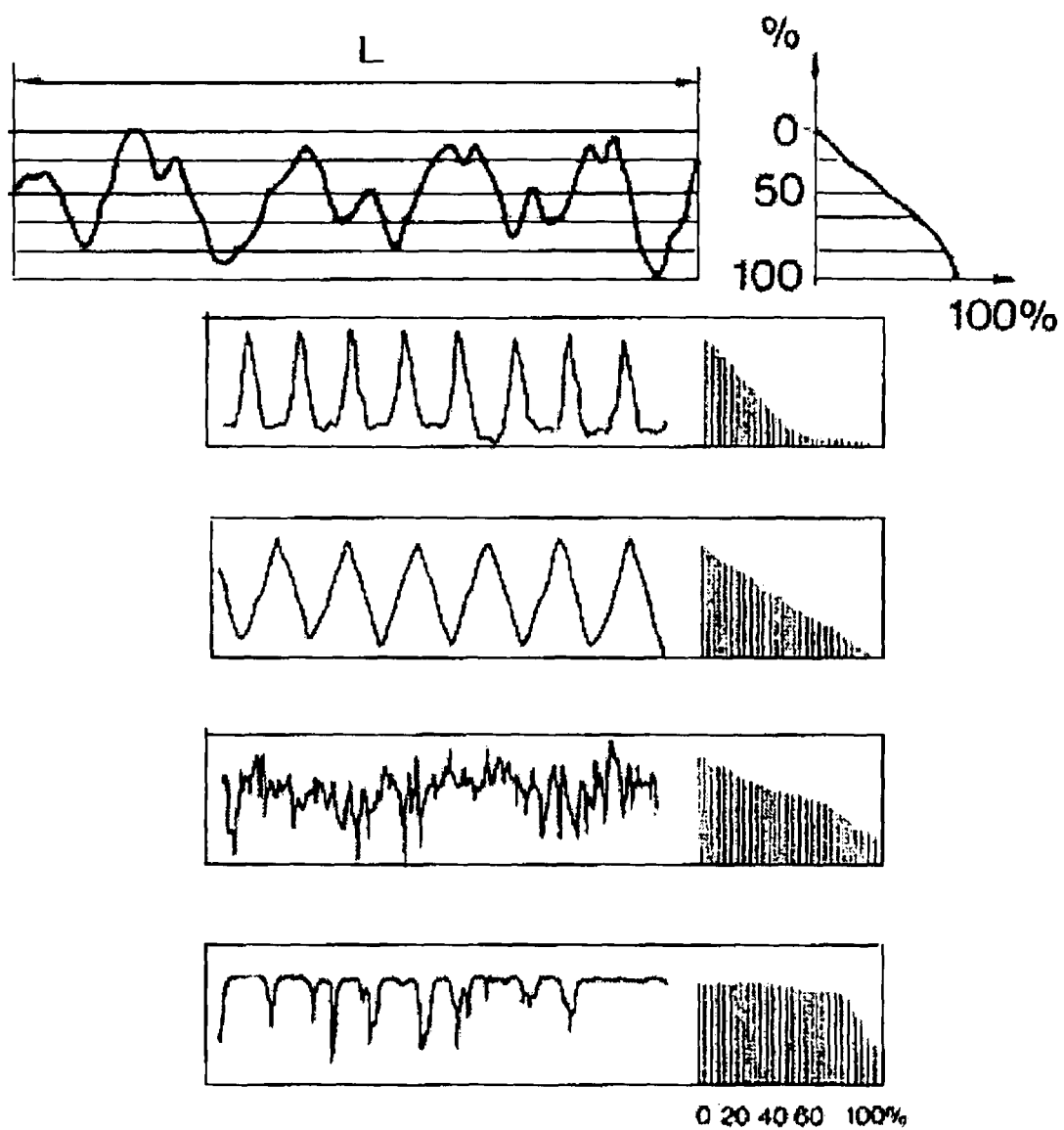

METHOD OF TREATING SURFACE OF MOLD AND MOLD HAVING SURFACE TREATED BY SAID METHOD

BACKGROUND OF THE INVENTION

1. Field of the Invention

The present invention relates to a method of treating a surface of a mold, form or die (in the text, called "mold" for both terms) and to a mold having a surface treated by said method, and more specifically, it relates to a method of treating a surface of a mold which can improve the demoldability of molded products from the mold and to a mold having a surface treated by this method to achieve excellent demoldability.

2. Description of the Related Art

In case that a mold used for molding metal or resin has rough irregularities on its molding surface, such irregularities are transferred to a molded product (workpiece). Thus, finishing of the surface of the workpiece is required after molding. In addition, because the surface of the workpiece is engaged with the irregularities on the surface of the mold, which decreases the demoldability, the productivity significantly decreases during molding.

Therefore, typically, surfaces of molds are polished to a mirror finish by hand. This not only enables works to be finished in smooth surfaces, but also provides the required demoldability for works.

However, in recent years, the number of molds having a complex shape has been increasing, and demands for quick delivery of molds are rising. Thus, mirror-polishing of surfaces of molds by hand, which consumes a lot of time and effort, is an obstacle to meeting such demands and causes an increase in fabrication cost of the molds.

Moreover, depending on the shape and material of workpieces to be molded, the required demoldability cannot always be obtained even by mirror-polishing of surfaces of molds.

Thus, methods that can be substituted for mirror-polishing by hand have been proposed to improve the demoldability of works. Examples of such methods include increasing the draft angle of a cavity of a mold and subjecting the surface of the mold to treatment for improving slip, e.g., forming a diamond-like carbon film (DLC).

In contrast to applying a mirror finish to a surface of a mold, methods in which irregularities having a predetermined shape are formed on a surface of a mold have been proposed. An example of such methods is ejecting spherical abrasive particles at high speed onto the surface of the mold for molding rubber products to create spherical dimples with a diameter of from 10 µm to 30 µm, and then forming a hard chromium coating thereon (see claim 1 of the Publication of Japanese Patent No. 3154033).

The reasons for applying a mirror finish to a surface of a mold as described above are that, irregularities occurring on the surface of the mold are transferred to the surface of a workpiece, forming unwanted irregularities on the surface of the workpiece, and that the workpiece cannot be removed from the mold (for example, the workpiece cannot be moved parallel to the surface of the cavity of the mold) if the irregularities on the surface of the mold are engaged with the irregularities on the surface of the workpiece transferred from the mold.

On the other hand, excellent demoldability cannot always be obtained by mirror-finished surfaces of molds. According to one report, the demoldability can be improved by forming relatively fine recesses in the surface of the mold in the case of molding rubber products for cars (see the Publication of Japanese Patent No. 3154033).

However, when recesses are formed by blasting as described in the aforementioned Publication of Japanese Patent No. 3154033, not only are recesses formed in the surface of the mold by the collision of spherical abrasive particles, but also protrusions appear on the surface of the mold as a result of the base material of the mold being pushed out by the collision of the abrasive particles (see the enlarged view in FIG. 1B).

The protrusions generated in this way makes inroads into the surface of the workpiece produced by molding and thus interfere with the workpiece when the workpiece is removed from the mold, which decreases the demoldability.

Furthermore, when recesses are formed by the above-described method, the sharp protrusions generated simultaneously with the recesses serve as contact portions with the surface of the workpiece which make sliding contact with the surface of the mold when the workpiece is removed from the mold. Thus, the surface of the mold comes into point contact with the workpiece, leaving scratches on the surface of the workpiece when the workpiece is removed from the mold. Furthermore, because the load is concentrated on the peaks of the protrusions, the surface of the mold is easily worn.

Accordingly, an object of the present invention is to provide advantages in that improved demoldability achieved by creating irregularities are further enhanced by creating, on the mold surface, irregularities with the peaks being evened out and flattened by a blasting, that the surface of the workpiece is prevented from being scratched, and that wear of the mold is prevented by avoiding load concentration on one part of the surface of the mold with relative ease and without the need for laborious work such as polishing by hand.

SUMMARY OF THE INVENTION

In order to achieve the above objective, a method of treating a surface of a mold according to the present invention is characterized by comprising the steps of subjecting the surface of the mold to:

a first blasting for removing a hardened layer produced on the surface and/or for adjusting the surface roughness;

a second blasting for creating fine irregularities on the surface; and a third blasting for flattening peaks of the irregularities created on the surface, the third blasting being performed by causing an ejected abrasive to slide along the surface of the mold.

In the method of treating the surface of the mold described above, the third blasting may be performed by ejecting an elastic abrasive in which abrasive grains are kneaded in an elastic body and/or abrasive grains are carried on a surface of the elastic body onto the surface of the mold at an inclined incidence angle.

Alternatively, instead of ejecting the elastic abrasive, the third blasting may be performed by ejecting a plate-like abrasive having a planar shape with a maximum length that is 1.5 to 100 times the thickness thereof onto the surface of the mold at an inclined incidence angle.

Furthermore, in the method of treating the surface of the mold, the first blasting may be performed so that the ejected abrasive is caused to slide along the surface of the mold.

In such case, same as the third blasting, the first blasting may be performed by ejecting the elastic abrasive in which abrasive grains are kneaded in an elastic body and/or abrasive grains are carried on a surface of the elastic body onto the surface of the mold at an inclined incidence angle in the first blasting, alternatively, the first blasting may be performed by ejecting a plate-like abrasive having a planar shape with a maximum length that is 1.5 to 100 times the thickness thereof is onto the surface of the mold at an inclined incidence angle.

Furthermore, in any of the above mentioned methods of treating the surface of the mold, the second blasting may be performed by ejecting a spherical abrasive, and in the case, it is preferable that the second blasting be performed until a coverage of 100% is achieved.

Alternatively, instead of ejecting the spherical abrasive, the second blasting may be performed by ejecting a grit-like abrasive, and in the case, it is preferable that the second blasting be performed until a coverage of 60% to 100% is achieved.

Furthermore, the present invention also relates to a mold having a surface treated by any of the above mentioned methods and characterized in that the distribution of heights of 70% or more in the surface of the mold in the load curve is 70% or more.

With the above-described configuration of the present invention, by using the surface treatment method of the present invention, recesses that can improve the demoldability can be formed on a surface of a mold by a relatively easy procedure, namely, a blasting, without the need for laborious work such as polishing the surface of the mold by hand to a mirror finish.

Moreover, because the peaks of the portions between the recesses formed in this way are evened out and flattened, the mold does not leave scratches on the surface of the workpiece when it comes into contact with the workpiece. Furthermore, rapid wearing of the surface of the mold resulting from load concentration due to contact with the surface of the workpiece can be prevented.

By ejecting an elastic abrasive or a plate-like abrasive at the surface of the mold at an inclined incidence angle in a third blasting, the abrasive can be relatively easily made to slide along the surface of the mold. Thus, the peaks of the irregularities on the surface of the mold resulting from a second blasting can be easily removed and evened out.

Furthermore, by ejecting an elastic abrasive or a plate-like abrasive onto the surface of the mold at an inclined incidence angle in a first blasting similarly to the above, a surface-hardened layer can be easily removed, and the surface of the mold can be easily evened out.

Note that, when a spherical abrasive is ejected onto the surface of the mold in the second blasting, in particular, when the spherical abrasive is ejected such that a coverage of 100% is achieved, the width (denoted by W in the enlarged view in FIG. 1C) of the contact portion of the surface of the mold with the workpiece is relatively narrow. Thus, not only is the contact resistance when the workpiece is removed from the mold significantly reduced, but also air and a demolding agent can easily flow into the recesses.

On the other hand, when grit which is a polygonal abrasive is ejected onto the surface of the mold in the second blasting, in particular, when grit is ejected such that a coverage of 60% to 100% is achieved, the width of the contact portion of the surface of the mold (W in the enlarged view in FIG. 2C) with the workpiece is relatively large. However, because the sharp peaks of the protrusions have been removed, stress concentration is less likely to occur. Furthermore, because the recesses in the surface of the mold are scattered, air and a demolding agent can be easily trapped in the recesses during molding.

As a result, the demoldability of works can be significantly improved in any case.

That is, the presence of the recesses makes it easy for a demolding agent to be deposited and held on the surface of the mold, and the presence of the recesses also prevents the workpiece from sticking to the surface of the mold and allows the workpiece to slide easily. Moreover, because the contact area between the workpiece and the surface of the mold is reduced, the frictional resistance decreases. Again, there are advantages in that the workpiece is prevented from being engaged with the peaks of the protrusions of the mold, that the recesses trap gas (air and other gases), and that the friction is reduced. Thus, the demolding resistance is reduced. As a result, the demoldability are significantly improved.

According to formation of such recesses, an insulation effect is provided by the presence of air traps or oil traps, thereby heat conduction can be prevented. Thus, the mold is less likely to conduct heat to the workpiece and is less likely to be cooled. As a result, when molding is continuously performed using the same mold, the time for heating the mold for the next molding can be reduced. Thus, the productivity can be improved.

BRIEF DESCRIPTION OF THE DRAWINGS

The objects and advantages of the invention will become apparent from the following detailed description of preferred embodiments thereof provided in connection with the accompanying drawings in which:

FIGS. 1A to 1C are diagrams schematically showing a method of treating a surface of a mold of the present invention, in which FIG. 1A shows a first blasting, FIG. 1B shows a second blasting, and FIG. 1C shows a third blasting;

FIGS. 2A to 2C are diagrams schematically showing another method of treating a surface of a mold of the present invention, in which FIG. 2A shows a first blasting, 2B shows a second blasting, and 2C shows a third blasting;

FIG. 3 is a diagram showing load curves; and

DETAILED DESCRIPTION OF THE PREFERRED EMBODIMENTS

Embodiments of the present invention will be described below with reference to the attached drawings.

Outline of Surface Treatment Method

A method of treating a surface of a mold of the present invention includes the steps of subjecting the surface of the mold (the surface of a portion that comes into contact with the workpiece) to be treated to a first blasting for removing a surface-hardened layer generated when the mold is fabricated and/or for adjusting the surface roughness, e.g., flattening; a second blasting for creating fine irregularities on the surface of the mold after the first blasting; and a third blasting for flattening peaks of the irregularities created on the surface of the mold after the second blasting.

Object to be Treated (Mold)

The surface treatment method of the present invention is widely intended for products that are generally called "molds", and various molds can be treated without limiting the use of the molds.

Examples of the mold that can be treated by the surface treatment method of the present invention include various molding dies intended for metal processing, in which the molding load is high; open-type molding dies in which a material is held between upper and lower molds; molds intended for metal casting or resin molding, in which the molding load is relatively low; closed-type molds in which a material is injected into a closed mold; and molds for press-molding.

In particular, the present invention is effective for the surface treatment of a mold that is used to mold a workpiece made of metal or hard resin that, unlike elastic material such as rubber or elastomer, cannot be removed from the mold due to engagement of their shapes when the surface shape of the workpiece is molded so as to conform to the surface shape of the mold.

However, the surface treatment method of the present invention may be performed on a mold that is used to mold a workpiece made of elastic material such as rubber or elastomer.

First Blasting

Figure 1A:
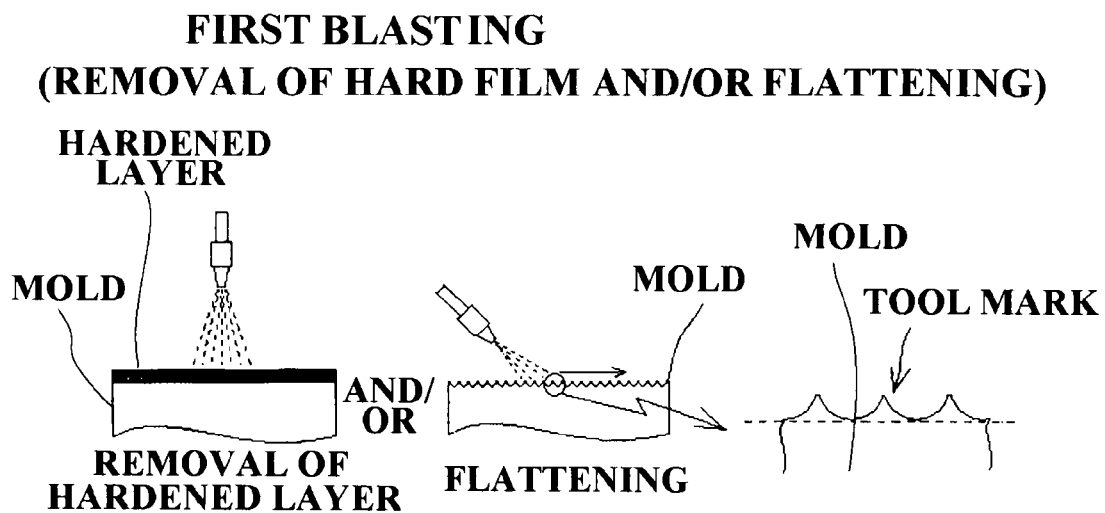
Figure 2A:
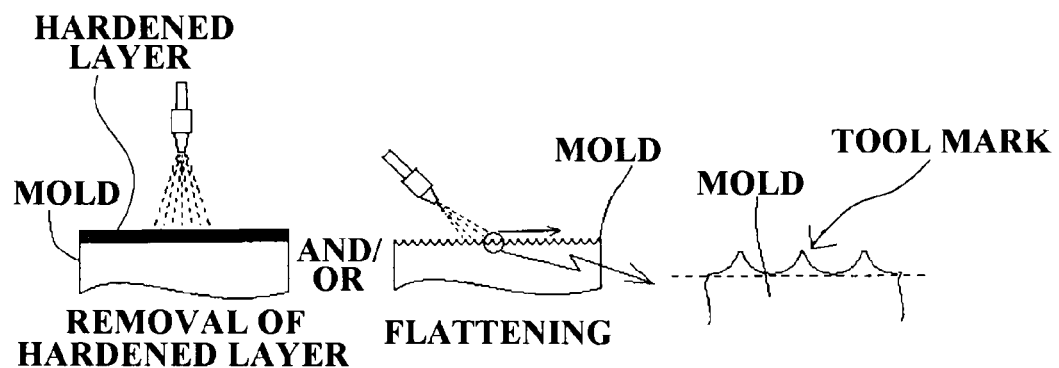

First, a first blasting is performed on a mold to be treated, at least on the surface of a portion in contact with a workpiece, e.g., the surface of a cavity in the case where the mold is the above-described one (see FIGS. 1A and 2A).

The first blasting is performed to improve the surface of the mold. This blasting is so-called base treatment for improving the surface condition of the mold, in which a surface-hardened layer such as an arc-hardened layer generated when the mold is fabricated is removed, and tool marks (for example, irregularities resulting from processing marks generated along the path of movement of a cutting tool) are removed to flatten the surface of the mold.

This first blasting can be performed by a typical blasting known as a "blasting" or "sand-blasting". The material and particle diameter of the abrasive to be used and the processing conditions such as the ejection pressure and the processing duration can be selected from various known materials, particle diameters, and processing conditions according to the material and use of the mold to be treated.

The first blasting may include several steps, in which, for example, the particle diameter of the abrasive to be used and/or the ejection pressure is gradually reduced.

The first blasting may include, instead of or in addition to the above-mentioned typical known blasting, treatment for flattening the surface by causing the ejected abrasive to slide along the surface of the mold.

Examples of the abrasive that is caused to slide along the surface of the mold include an elastic abrasive in which an abrasive is carried on the surface of an elastic material (an elastic body, such as rubber or elastomer, a resin foam, or another viscoelastic body, such as a crushed rhizome of plant, devil's tongue, or gelatin) and/or in which an abrasive is kneaded in such an elastic material. This elastic abrasive can be ejected onto the surface of the mold at an inclined ejection angle of for example, less than 90°, and more preferably, at an inclination angle X of $0° \leq X \leq 80°$.

Alternatively, instead of the above-mentioned elastic abrasive, plate-like abrasive having a planar shape with a maximum length of from about 0.05 mm to 10 mm, which is 1.5 to 100 times the thickness thereof, the plate-like abrasive being made of abrasive grains themselves formed in a planar shape, abrasive grains bonded by a binder and formed in a planar shape, or a planar base material (paper, metal, resin, or the like) carrying abrasive grains on the surface thereof and/or a planar base material in which abrasive grains are kneaded, may be ejected onto the surface of the mold at the same inclined ejection angle as described above.

Thus, the abrasive upon colliding with the surface of the mold can be caused to slide along the surface of the mold, thereby improving the surface of the mold to a flat surface free of tool marks and the like. Furthermore, a hard film or the like can be removed if there is any such a film formed on the surface of the mold.

Second Blasting

After the first blasting is performed on the surface of the mold to improve the surface as described above, a second blasting for forming predetermined recesses on the surface of the mold is performed.

When forming hemispherical recesses in the second blasting, a spherical abrasive made of metal, ceramic, glass, cemented carbide, or the like having an average particle diameter of from 10 μm to 100 μm is ejected to create fine irregularities including hemispherical recesses on the surface of the mold (see FIG. 18).

When the recesses to be formed are hemispherical recesses, it is preferable that such recesses be formed on the surface of the mold such that the percentage of the area of the surface of the mold covered by dents (herein called "coverage") of from 60% to 100% is achieved.

Figure 2B:
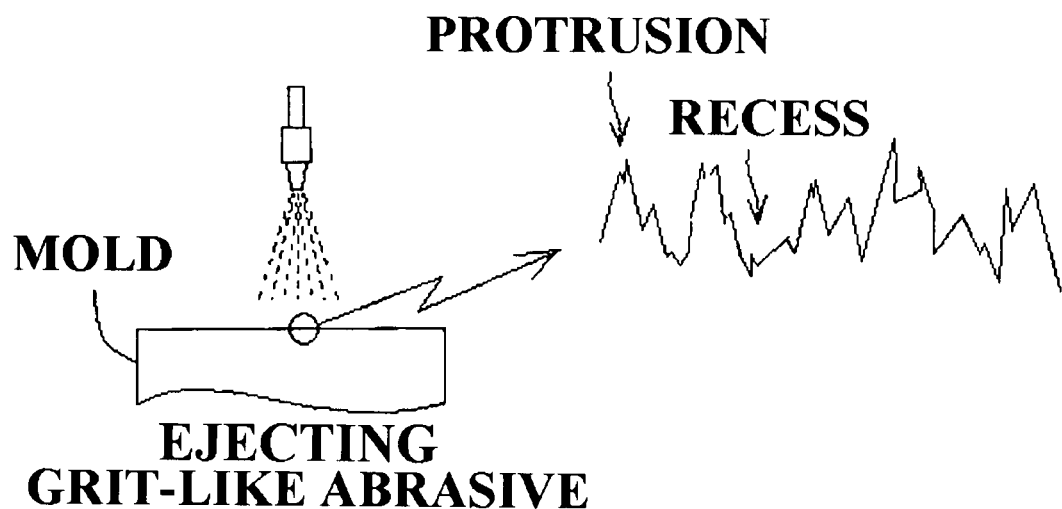

Furthermore, the irregularities do not necessarily have to be created by ejecting the above-mentioned spherical abrasive in the second blasting, but may be created by ejecting grit which is a polygonal abrasive (see FIG. 2B). In such a case, grit having an average particle diameter of from 10 μm to 100 μm (for example, a grit composed of alundum, carborundum, zircon, glass, metal, cemented carbide or the like) is ejected on the surface of the mold to create irregularities.

In the case of creating irregularities on the surface of the mold by ejecting grit as described above, it is preferable that a coverage of from 60% to 100% be achieved.

Third Blasting

Figure 1B:
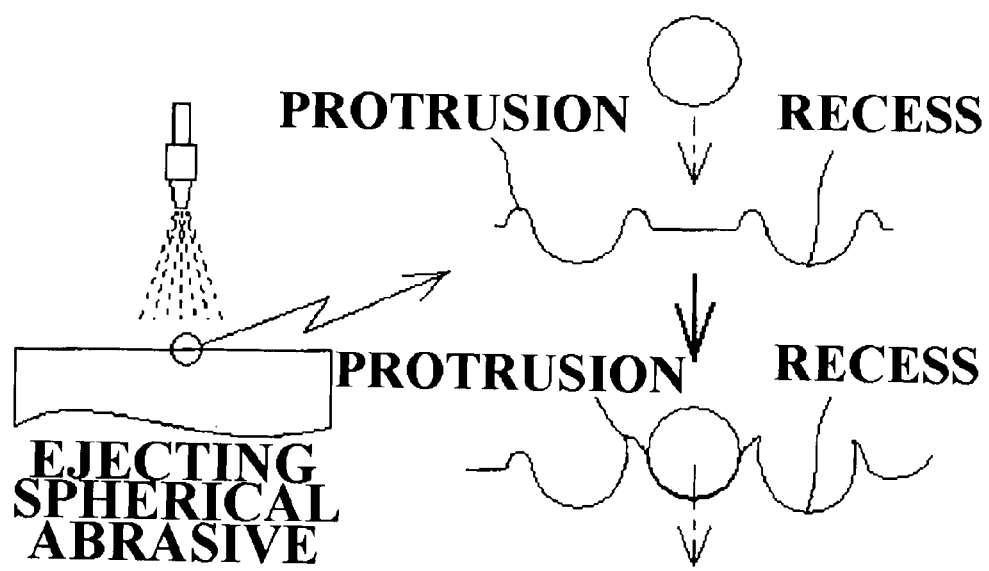

When the spherical abrasive is caused to collide with the surface of the mold to create irregularities thereon in the second blasting as described above, protrusions protruding from the surface of the mold are formed by the base material of the mold being pushed out during collision of the spherical abrasive, as shown in the enlarged view in FIG. 1B. In particular, when the spherical abrasive is caused to collide with the surface of the mold until a coverage of 100% is achieved, the spherical abrasive collides with already formed protrusions, making the shape of the protrusions complex.

Furthermore, when the grit-like abrasive is caused to collide with the surface of the mold to create irregularities on the surface of the mold in the second blasting, recesses which are portions cut away by the collision of the abrasive, and protrusions which are portions remaining without being cut away, are formed as shown in FIG. 2B.

Therefore, even when the first blasting for flattening is performed in advance, the peaks of the irregularities created on the surface of the mold come into point contact with the workpiece, decreasing the demoldability of the workpiece and leaving scratches on the surface of the workpiece. In addition, the surface of the mold is rapidly worn because the load is concentrated on the peaks when the mold slides along the surface of the workpiece.

Figure 1C:
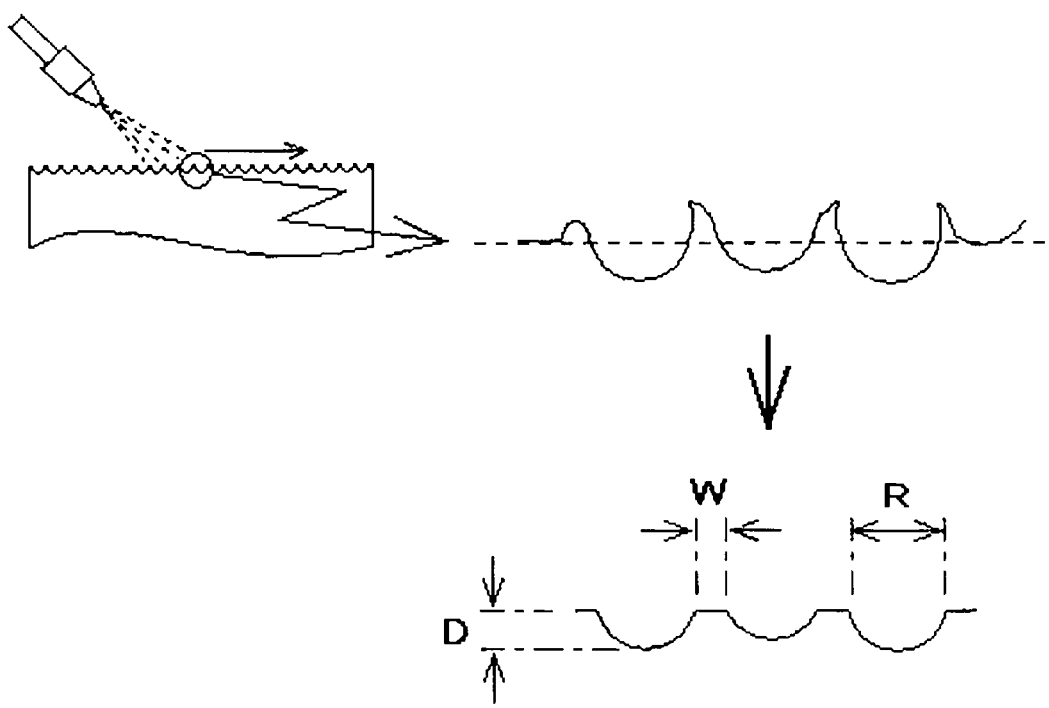
Figure 2C:
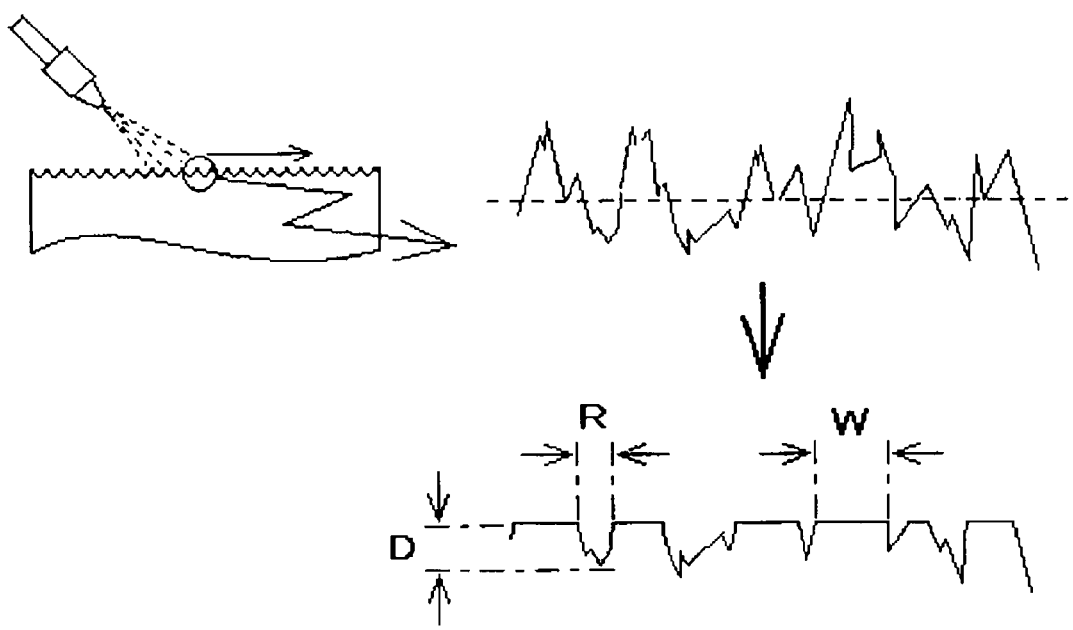

Accordingly, a third blasting in this step is performed on the irregularities created on the surface of the mold to flatten the peaks by removing the protrusions at a certain height (dotted line portions in enlarged views in FIGS. 1C and 2C show examples), while leaving the recesses that trap a demolding agent and air, as shown in enlarged views in FIG. 1C and FIG. 2C.

In the third blasting, the ejected abrasive is caused to slide along the surface of the mold to flatten the peaks of the protrusions.

Examples of the abrasive that is caused to slide include the abrasive that is caused to slide along the surface of the mold, similarly to the above-described first blasting. For example, an elastic abrasive in which an abrasive having an average particle diameter of from 1 μm to 50 μm is carried on the surface of an elastic material, and/or an elastic abrasive in which such abrasive is kneaded in the elastic material, or plate-like abrasive having a planar shape with a maximum length of from about 0.05 mm to 10 mm, which is 1.5 to 100 times the thickness thereof, may be used. By ejecting such abrasive onto the surface of the mold at an angle of less than 90°, more preferably, at an inclination angle X of 0°≤X≤80°, the ejected abrasive can be caused to slide along the surface of the mold. Thus, portions near the peaks of the protrusions can be removed at a substantially constant height, whereby the demoldability of works can be improved, and local load concentration can be prevented.

Surface Shape of Mold

When the spherical abrasive is ejected in the second blasting as shown in the enlarged view in FIG. 1C, hemispherical recesses with an opening diameter R of from 10 μm to 150 μm and a depth D of from 2 μm to 20 μm are provided in the surface of the mold after being subjected to the surface treatment as described above. Flat portions with a width W of from 20 μm to 60 μm are formed at the tips of the protrusions between the recesses.

On the other hand, when the grit-like abrasive is used in the second blasting as shown in the enlarged view in FIG. 2C, recesses having sharp bottoms, with an opening width R of from 5 μm to 50 μm and a depth D of from 5 μm to 60 μm, are formed. Flat portions with a width W of from 20 μM to 100 μM are formed at the tips of protrusions between the recesses.

In either of the surface of the molds formed as described above, the recesses are preferably created such that the distribution of heights of 70% or more in the load curve is 70% or more.

Herein, the term "load curve" refers to a graph in which the value of the load length ratio (tp) is plotted on the horizontal axis, and the height of the measurement curve which means the height of cutting is plotted on the vertical axis (see FIG. 3). The term "load length ratio (tp)" refers to a ratio described as a percentage of the total cut length (also referred to as "load length ηp") which is obtained by extracting a reference length L in the direction of the average line from the roughness curve, and by cutting the roughness curve of the extracted portion at a cut level parallel to the peak line, with respect to the reference length. The "load length ratio (tp)" indicates both information in the height direction and information in the horizontal direction, in which both tp% and cut level c μm or c % which is percentage with respect to Ry are described (see FIG. 4**) (JIS B0601-1994).

Figure 4:
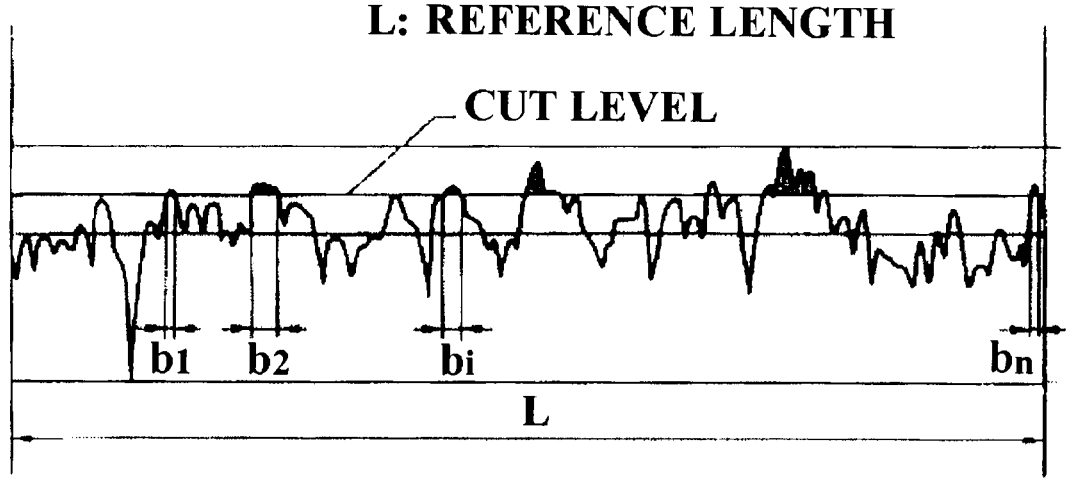
FIG. 4 is a diagram showing a load length ratio.

Note that FIGS. 3 and 4 are used only for describing the concept of the "load curve" and the "load length ratio", and the graphs in FIGS. 3 and 4 do not indicate the conditions of the surface of the mold treated by the method of the present invention.

On the surfaces of the molds configured as described above, in both of the configuration shown in FIG. 1C in which hemispherical recesses are formed, and the configuration shown in FIG. 2C in which recesses having sharp bottoms are formed, the peaks of the protrusions are evened out flatly. Thus, engagement with the surface of the workpiece can be prevented, and load concentration can be prevented.

Note that, in the configuration shown in FIG. 1C in which hemispherical recesses are formed, the width W of the portions that come into contact with the surface of the workpiece is relatively small. As a result, the likelihood of load concentration slightly increases. However, because air and a demolding agent can easily flow into the recesses, the demoldability are improved.

In contrast, on the surface of the mold shown in FIG. 2C, in which recesses having sharp bottoms are formed, the width W at the peaks that come into contact with the workpiece is relatively large. Thus, compared with the case where the hemispherical recesses are formed as described above, the contact resistance is large, however, stress concentration is less likely to occur, and, because the recesses on the surface of the mold are scattered in this configuration, therefore, air and a demolding agent are easily trapped in the recesses, and the air and the demolding agent once trapped therein, tend to remain.

As a result, in both of the cases where hemispherical recesses are formed as shown in FIG. 1C, and where recesses having sharp bottoms are formed as shown in FIG. 2C, excellent demoldability can be exhibited.

| | |
|---|---|
| Processing Example | |
| Object to be treated | Mold |
| Material of mold | SKD61 |
| Mold | diameter of core pin Φ30 mm, length 60 mm, and draft angle 0° |
| Workpiece for injection molding | made of POM (polyacetal) |
| | outside diameter Φ34 mm, |
| | inside diameter Φ30 mm, length 25 mm |
| (1) Comparative Example Ground finish (finished by a grinder) | |
| Surface roughness | Ra (μm): 0.100 μm |
| (2) Example 1 (hemispherical recesses are formed) | |
| Object to be treated | Same as comparative example |
| Blasting apparatus | Pneuma-blaster SGK-3 (suction type) manufactured |
| | by Fuji Manufacturing Co., Ltd. |
| (1) First Blasting | |
| Abrasive | FUJIRANDOM WA#220 (average particle diameter 60 μm) |
| Ejection pressure | 0.3 MPa |
| (2) Second Blasting | |
| Abrasive | Fuji glass beads FGB#320 |
| | (spherical glass beads; average particle diameter 40 μm) |
| Ejection pressure | 0.3 MPa |
| (3) Third Blasting | |
| Blasting apparatus | LDQ-SR-3 (blower type) manufactured |
| | by Fuji Manufacturing Co., Ltd. |
| Abrasive | Elastic body (rubber) with abrasive grains (silicon carbide |
| | #3000 having an average particle diameter of 4 μm) kneaded therein |
| Ejection pressure | 0.06 MPa |
| Ejection angle | 30° |
| Surface roughness | Ra: 0.09 μm |

-continued (3) Example 2 (recesses having sharp bottoms are formed)
 Object to be treated  Same as comparative example
 Blasting apparatus  Pneuma-blaster SGK-3 manufactured by
          Fuji Manufacturing Co., Ltd.
 (1) First Blasting
  Abrasive    FUJIRANDOM WA#220 (average particle diameter 60 μm)
  Ejection pressure 0.3 MPa
 (2) Second Blasting
  Abrasive    FUJIRANDOM #400 (average particle diameter 30 μm)
  Ejection pressure 0.3 MPa
 (3) Third Blasting
  Blasting apparatus LDQ-SR-3 (blower type) manufactured
         by Fuji Manufacturing Co., Ltd.
  Abrasive    Elastic body (rubber) with abrasive grains (silicon carbide
         #3000 having an average particle diameter of 4 μm) kneaded therein
  Ejection pressure 0.06 MPa
  Ejection angle  30°
  Surface roughness Ra: 0.11 μm
(4) Measurement of demolding resistance
 The demolding resistance in the above-described Comparative Example and
Examples were measured.
Demolding resistance
Comparative Example    1
Example 1        0.2
Example 2        0.25
(The demolding resistance demolding resistance were measured using a piezoelectric
quartz-crystal sensor manufactured by Kistler Japan Co., Ltd.; Comparative Example was
assumed to be 1.0)

From the above descriptions, it is understood that the demolding resistance is as low as from 20% to 25% of that of the Comparative Example, although the example of the present invention is not so different from the Comparative Example in terms of surface roughness.

In this specification and claims, "mold" includes "mold and die", "form" or "die".

Thus the broadest claims that follow are not directed to a machine that is configured in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

What is claimed is:

1. A mold having fine recesses in a surface thereof, the recesses being formed by a method comprising subjecting the surface of the mold to:
 a first blasting performed by ejecting an elastic abrasive in which abrasive grains are kneaded in an elastic body and/or abrasive grains are carried on a surface of the elastic body onto the surface of the mold at an inclined incidence angle for removing a hardened layer produced on the surface and/or for adjusting the surface roughness;
 a second blasting for creating fine irregularities on the surface by ejecting abrasives onto the surface of the mold; and
 a third blasting for flattening peaks of protrusions of the irregularities created on the surface, the third blasting being performed by causing an ejected abrasive to slide along the surface of the mold,
 wherein said surface of said mold comprises flat portions each with a width W of from 20 μm to 100 μm in which peaks of the protrusions exceeding a predetermined height between the recesses are evened out and flattened.

2. The mold according to claim 1, wherein the fine irregularities including the recesses, wherein each of said recesses has a hemispherical shape, are formed on the surface by performing the second blasting by ejecting a spherical abrasive.

3. The mold according to claim 2, wherein the recesses are created such that the distribution of heights of 70% or more in a load curve for the surface of the mold is 70% or more.

4. The mold according to claim 2, wherein hemispherical recesses with an opening diameter R of from 10 μm to 150 μm and a depth D of from 2 μm to 20 μm are provided in the surface of the mold after being subjected to the first to third blastings.

5. The mold according to claim 2, wherein flat portions each having a width W of from 20 μm to 60 μm are formed at the tips of the protrusions between the recesses.

6. The mold according to claim 2, wherein the fine irregularities are formed on the surface by performing the second blasting until a coverage of 100% is achieved.

7. The mold according to claim 1, wherein the fine irregularities including the recesses, wherein each of said recesses has sharp bottoms, are formed on the surface by performing the second blasting by ejecting a grit-like abrasive.

8. The mold according to claim 7, wherein the recesses are created such that the distribution of heights of 70% or more in a load curve for the surface of the mold is 70% or more.

9. The mold according to claim 7, wherein recesses each having sharp bottoms, with an opening width R of from 5 μm to 50 μm and a depth D of from 5 μm to 60 μm, are formed.

10. The mold according to claim 7, wherein the fine irregularities are formed on the surface by performing the second blasting until a coverage of 60% to 100% is achieved.

11. The mold according to claim 1, wherein the recesses are created such that the distribution of heights of 70% or more in a load curve for the surface of the mold is 70% or more.

12. The mold according to claim 1, wherein the peaks of the protrusions between the recesses are evened out and flattened by ejecting an elastic abrasive in which abrasive grains are kneaded in an elastic body and/or abrasive grains are carried on a surface of the elastic body onto the surface of the mold at an inclined incidence angle as the third blasting.

13. The mold according to claim 12, wherein the fine irregularities are formed on the surface by performing the second blasting by ejecting a spherical abrasive.

14. The mold according to claim 12, wherein the fine irregularities are formed on the surface by performing the second blasting by ejecting a grit-like abrasive.

15. The mold according to claim 1, wherein the peaks of the protrusions between the recesses are evened out and flattened by performing the third blasting by ejecting a plate-like abrasive having a planar shape with a maximum length that is 1.5 to 100 times the thickness thereof onto the surface of the mold at an inclined incidence angle.

16. The mold according to claim 1, wherein the hardened layer produced on the surface and/or for adjusting the surface roughness are removed by performing the first blasting so that the ejected abrasive is caused to slide along the surface of the mold.

* * * * *